(12) United States Patent
Kamin-Lyndgaard

(10) Patent No.: US 8,965,026 B2
(45) Date of Patent: Feb. 24, 2015

(54) METHOD AND APPARATUS FOR REMOTE CAPTURE OF AUDIO IN A HANDHELD DEVICE

(75) Inventor: Andrew Charles Kamin-Lyndgaard, Minneapolis, MN (US)

(73) Assignee: Canopy Co., Minneapolis, MN (US)

( * ) Notice: Subject to any disclaimer, the term of this patent is extended or adjusted under 35 U.S.C. 154(b) by 0 days.

(21) Appl. No.: 13/494,004

(22) Filed: Jun. 11, 2012

(65) Prior Publication Data

US 2012/0314131 A1    Dec. 13, 2012

Related U.S. Application Data

(60) Provisional application No. 61/520,463, filed on Jun. 10, 2011.

(51) Int. Cl.
| H04R 1/02 | (2006.01) |
| H04N 5/926 | (2006.01) |
| H04N 5/77 | (2006.01) |
| H04R 1/08 | (2006.01) |
| G11B 27/10 | (2006.01) |

(52) U.S. Cl.
CPC ............. *H04N 5/9265* (2013.01); *H04N 5/772* (2013.01); *H04R 1/083* (2013.01); *H04R 2420/07* (2013.01); *G11B 27/10* (2013.01)
USPC ........... 381/361; 381/363; 381/364; 381/365; 348/515

(58) Field of Classification Search
USPC .......... 381/361, 363, 364, 365; 386/224, 225, 386/386, 387, 337, 338; 455/41.1, 41.3; 348/515
See application file for complete search history.

(56) References Cited

U.S. PATENT DOCUMENTS

| 2007/0176909 A1* | 8/2007 | Pavlowski .................... 345/179 |
| 2007/0294710 A1* | 12/2007 | Meesseman .................. 719/328 |
| 2009/0135856 A1* | 5/2009 | Gha et al. ..................... 370/503 |

* cited by examiner

*Primary Examiner* — Curtis Kuntz
*Assistant Examiner* — Joshua A Kaufman
(74) *Attorney, Agent, or Firm* — Charles A. Lemaire; Jonathan M. Rixen; Lemaire Patent Law Firm, P.L.L.C.

(57) ABSTRACT

Some embodiments herein include at least one of systems, methods, and devices for remote audio capture using a hand-held device. In some embodiments, the device captures, stores, and transmits audio to another device via wireless technologies. In some embodiments, the device may be used either as a hand-held microphone or as a lavaliere microphone.

20 Claims, 4 Drawing Sheets

METHOD AND APPARATUS FOR REMOTE CAPTURE OF AUDIO IN A HANDHELD DEVICE

RELATED APPLICATIONS

This patent application claims the benefit of priority, under 35 U.S.C. §119(e), to U.S. Provisional Patent Application Ser. No. 61/520,463, filed on Jun. 10, 2011, which is incorporated herein by reference in its entirety.

TECHNICAL FIELD

This invention relates to the field of mobile audio/video capture, analysis, processing and compiling of data including audio files and video files with a mobile device.

BACKGROUND

The problem with current technology is that current mobile devices have limited capabilities of capturing quality audio primarily because the quality of microphone and the microphones proximity to the subject.

Other systems are limited in several aspects specific to audio. Smart devices, such as smart phones have increasing capabilities with several application including camera and video camera function. The current design of a smart phone in one embodiment, the iPhone®, does not enable 'remote' audio capture as the audio microphone input is located on the phone, or the device.

DETAILED DESCRIPTION

Smart devices, such as smart phones have increasing capabilities with several applications including camera and video camera functions.

The current design of smart phones, such as the iPhone®, does not enable 'remote' audio capture because the audio input is located on the smart phone.

Some embodiments of the invention solve a needed feature to capture and record audio input. In some embodiments, audio input and video input are captured and recorded.

Figure 1:
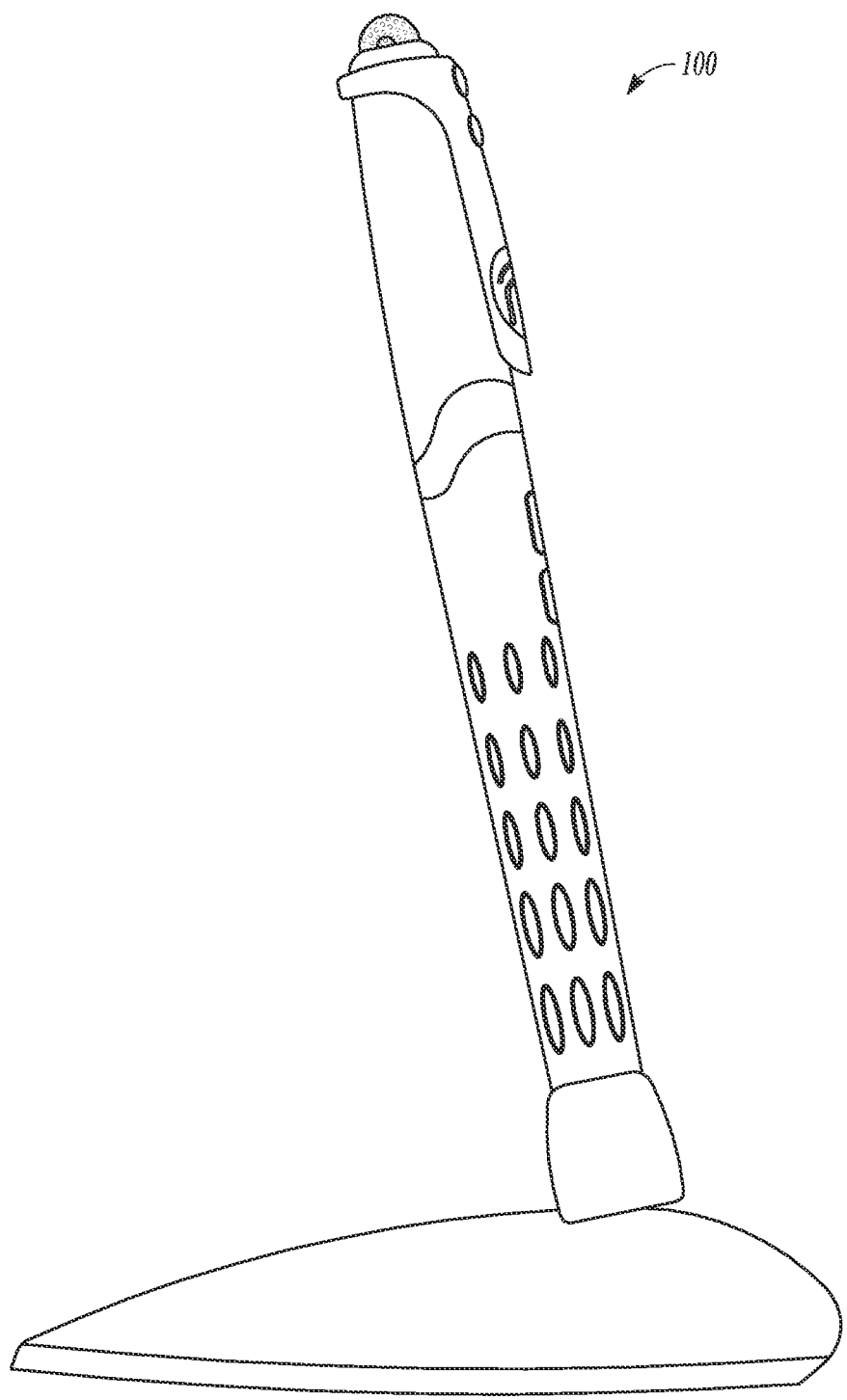
FIG. 1 illustrates an apparatus for remote capture of audio in a handheld device, in accordance with some embodiments.

FIG. 1 illustrates an apparatus for remote capture of audio in a handheld device, in accordance with some embodiments. Device 100 can be used to capture and record audio input.

AlignSync is a tool within the method of the invention (the AlignSync tool is also referred to herein as an application, module, or algorithm). The AlignSync application, in one embodiment, addresses latency issues between the audio and video data.

In some embodiments, the AlignSync tool is implemented with one or more handheld consumer devices.

In another embodiment, the device is another iPhone®.

Figures 2A, 2B:
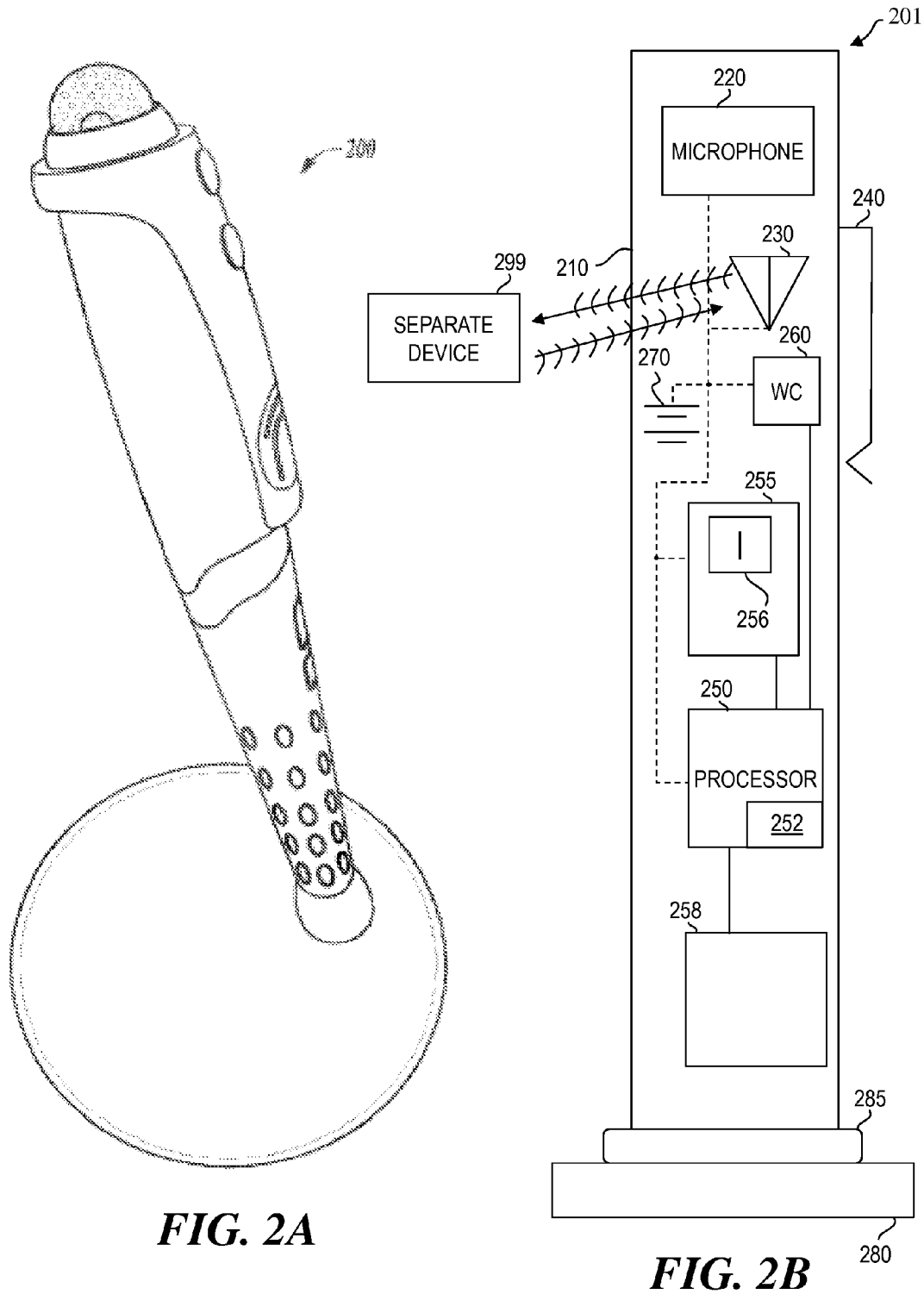
FIG. 2A illustrates an apparatus for remote capture of audio in a handheld device, in accordance with some embodiments.
FIG. 2B illustrates an apparatus 201, and also illustrates a second device 299 in communication with first device, apparatus 201, according to some embodiments of the present invention.

FIG. 2A illustrates an apparatus for remote capture of audio in a handheld device, in accordance with some embodiments. In some embodiments, the device 200 is an electronic device with audio capabilities.

In another embodiment, the device is a specifically designed apparatus for capturing audio input.

In another embodiment, the above apparatus, captures, stores, and transmits audio data to a separate device using wireless technology.

FIG. 2B illustrates an apparatus 201. The apparatus 201 includes an elongated housing structure 210 of sufficient length to fit in the palm of a human hand, the elongated housing structure with two ends; a microphone 220 operable to capture audio data located on one of the two ends of the elongated housing structure; an antenna 230 within the housing structure, operable to transmit wirelessly the captured audio data to other devices; a clip 240 attached to the elongated housing structure, operable to attach the housing structure to human clothing; a processor 250; a first memory 255 coupled to the processor; instructions 256 stored on the first memory, operable to cause the processor to execute a wireless protocol; a wireless application programming interface (API) 252 executable by the processor to send and receive data; a wireless chip 260 coupled to the processor 250, the wireless chip operable to send and receive wireless signals; a battery 270, which supplies power to the microphone, the antenna, the processor, the first memory, and the wireless chip; wherein the apparatus can be worn and used by a human as a lavaliere microphone, and wherein the apparatus can be used as a hand-held microphone. In some embodiments, the apparatus 201 further includes a second memory 258, coupled to the processor 250, operable to store streams of audio data captured by the microphone 220. In some embodiments, the housing structure 210 is attachable to a stand 280 via a tripod socket 285, thereby permitting hands-free use. FIG. 2B also illustrates a second device 299 in communication with first device, apparatus 201, according to some embodiments of the present invention.

A method in which audio is captured on a device, transmitted via wireless technology, to a second device.

A method in which a device capable of collecting audio input wirelessly from a second device, wherein there first device is also capable of video input, wherein the method includes a software application that uses the AlignSync module on the audio and the video.

In one embodiment the AlignSync module is pre-programmed to automate the synchronization of the audio with the video.

In one embodiment, the AlignSync module has user defined parameters.

In one embodiment, the second device is a smart phone.

Figure 3:
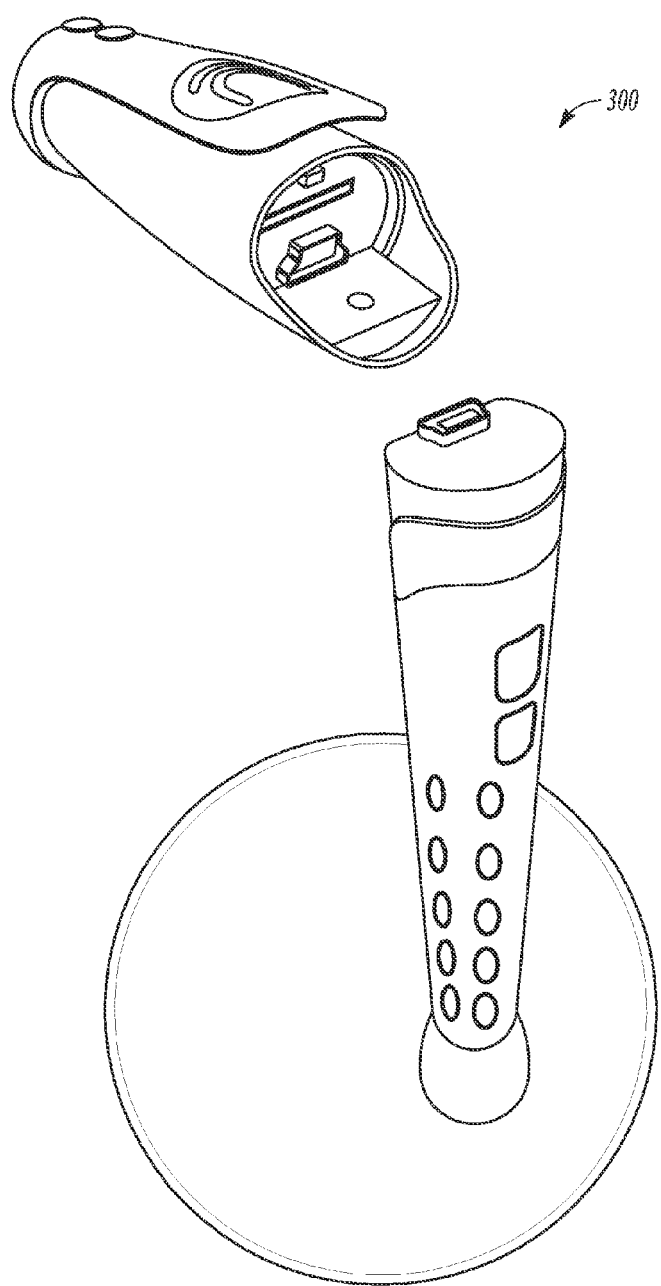
FIG. 3 illustrates the connection ports of an apparatus for remote capture of audio in a handheld device, in accordance with some embodiments.

FIG. 3 illustrates the connection ports of an apparatus for remote capture of audio in a handheld device, in accordance with some embodiments. In some embodiments, the first device 300 may be connected to the second device by a wired connection.

In one embodiment, the device is a Bluetooth® connected microphone enabling the remote/wireless capture of audio to smart phones.

In some embodiments, the device transmits audio signals to a Bluetooth®-enabled smart phone via Bluetooth®.

In some embodiments, the device transmits camera start/stop commands to a smart phone.

Figure 4:
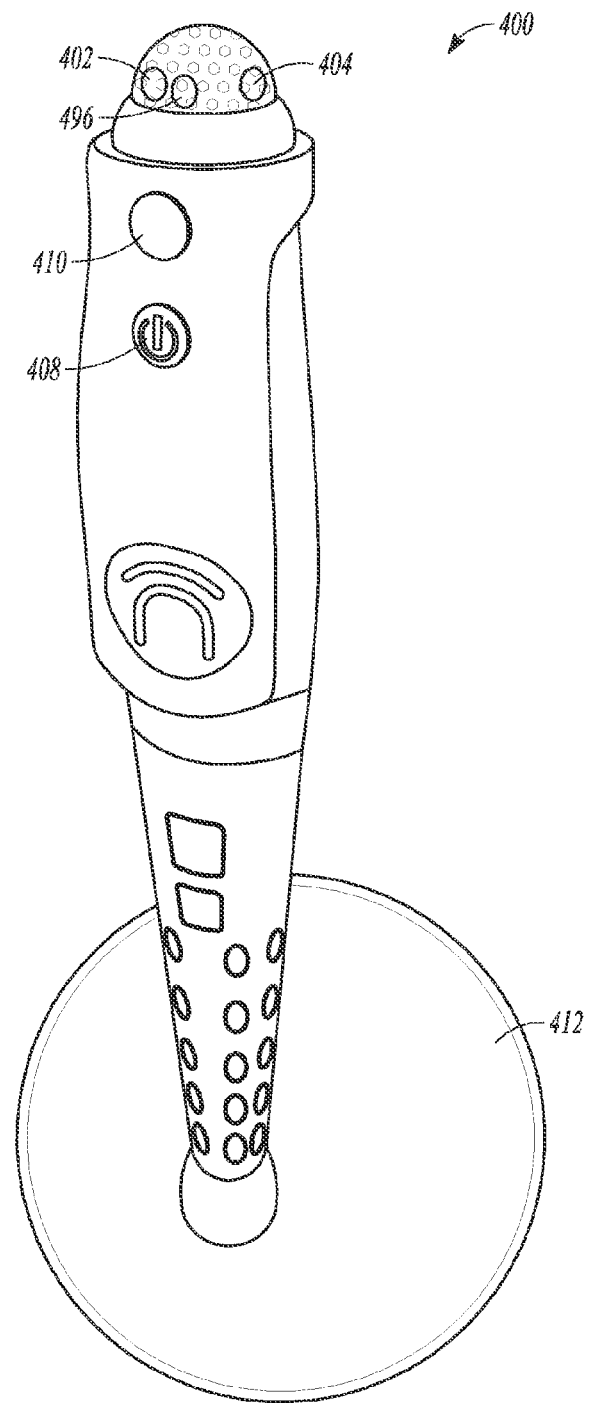
FIG. 4 illustrates the external components of an apparatus for remote capture of audio in a handheld device, in accordance with some embodiments.

FIG. 4 illustrates the external components of an apparatus for remote capture of audio in a handheld device, in accordance with some embodiments. In some embodiments, the device 400 may be used as a hand-held microphone or as a lavaliere microphone. In some embodiments, device 400 includes a power/charging indicator LED 402, a recording indicator LED 404, and a Bluetooth® Sync indicator LED 496. In some embodiments, device 400 further includes a Bluetooth® Sync botton 410 and a record botton 408. In some embodiments, the invention includes a stand 412.

In some embodiments, the device may contain integrated or removable memory to which an audio file (mp3, wav, etc.) can be recorded.

In some embodiments, the device may charge via a battery in the base of the unit, or via a direct current power adapter.

In some embodiments, an algorithm, known as AlignSync, calculates and removes latency between the audio and video files for seamless playback.

In one embodiment, the AlignSync algorithm is designed to run on Apple® iOS® v.4 or above.

In one embodiment, the stem of the microphone attaches via ¼ 20″ tripod socket to a stand permitting hands free (on-dash) use.

In one embodiment, the AlignSync algorithm is designed to operate on the Android™ mobile OS.

In one embodiment, the AlignSync application permits the user to "scrub" or position the audio timeline in relationship to the video timeline.

In one embodiment, the AlignSync application automatically synchronizes the audio timeline to the video timeline.

In one embodiment, the AlignSync application records audio and/or video.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A system comprising:
   a first device that includes:
   an elongated housing structure of sufficient length to fit in the palm of a human hand, the elongated housing structure with two ends;
   a microphone operable to capture audio data located on one of the two ends of the elongated housing structure;
   an antenna within the housing structure, operable to transmit wirelessly the captured audio data to other devices;
   a clip attached to the elongated housing structure, operable to attach the housing structure to human clothing;
   a processor;
   a first memory coupled to the processor;
   instructions stored on the first memory, operable to cause the processor to execute a wireless protocol;
   a wireless application programming interface (API) executable by the processor to send and receive data;
   a wireless chip coupled to the processor, the wireless chip operable to send and receive wireless signals;
   a battery, which supplies power to the microphone, the antenna, the processor, the first memory, and the wireless chip;
   wherein the first device is worn and used by a human as a lavaliere microphone, and wherein the first device is used as a hand-held microphone;
   a second device, wherein the second device wirelessly receives a stream of the audio data from the first device, wherein the second device captures a stream of video data, and wherein there is a latency between the stream of audio data and the stream of video data;
   a calculator that calculates a latency between the stream of audio data and the stream of video data;
   a synchronizer that removes the latency between the audio and video data to synchronize the audio data and video data; and
   a combiner that combines the synchronized audio data and video data into an audio-video file.

2. The system of claim 1, wherein the wireless protocol is a Bluetooth® protocol.

3. The system of claim 1, wherein the elongated housing structure has a maximum diameter of 0.5 inches.

4. The system of claim 1, wherein the first device further includes a second memory, coupled to the processor, operable to store streams of audio data captured by the microphone.

5. The system of claim 4, wherein the second memory is removable.

6. The system of claim 1, wherein the battery is removable.

7. The system of claim 1, wherein the battery is rechargeable.

8. The system of claim 1, wherein the elongated housing structure is attachable to a stand via a tripod socket, thereby permitting hands-free use.

9. The system of claim 1, wherein the second device is a smart phone that further includes a second processor and a third memory, wherein the second processor executes an app stored in the third memory.

10. The system of claim 1, wherein the second device is an iPhone® that further includes a second processor and a third memory, wherein the second processor executes an app stored in the third memory.

11. The apparatus system of claim 1, wherein the second device receives the stream of audio data from the first device via a Bluetooth® connection.

12. The system of claim 1, wherein the second device is a smart phone that includes a second processor, a third memory, and a fourth memory, wherein the second processor executes an app stored in the third memory, wherein the fourth memory is removable, and wherein the second processor stores the audio-video file in the fourth memory.

13. The system of claim 1, wherein the second device includes a second processor, a third memory, and a fourth memory, wherein the second processor executes an app stored in the third memory, wherein the fourth memory is removable, and wherein the second processor stores the audio-video file in the fourth memory.

14. The system of claim 1, further comprising a recorder that records the audio-video file.

15. The system of claim 1, wherein the first device receives input from a user and, based on the input from the user, transmits start/stop commands to the second device.

16. The system of claim 1, wherein the second device is smart phone, and wherein the smart phone contains the calculator, the synchronizer, and the combiner.

17. The system of claim 1, wherein the calculator, the synchronizer, and the combiner operate on an audio timeline and a video timeline based on scrub information from a user to position the audio timeline in relation to the video timeline.

18. The system of claim 1, wherein the second device is a smart phone, and wherein the first device receives input from a user and, based on the input from the user, transmits start/stop commands to the smart phone.

19. The system of claim 1, wherein the housing structure is attachable to a stand via a tripod socket, thereby permitting hands-free use, and wherein the elongated housing structure has a maximum diameter of 0.5 inches.

20. The system of claim 1, wherein the first device further includes a second memory, coupled to the processor, operable to store streams of audio data captured by the microphone, and wherein the second device is a smart phone.

* * * * *